United States Patent
Mazzarella et al.

(10) Patent No.: US 7,421,450 B1
(45) Date of Patent: Sep. 2, 2008

(54) DATABASE EXTENSIBLE APPLICATION DEVELOPMENT ENVIRONMENT

(76) Inventors: Joseph R. Mazzarella, 110 Doyle Rd., Tolland, CT (US) 06084; Jeffrey D. Joyce, 16 Fawn Run Dr., Rocky Hill, CT (US) 06067

( * ) Notice: Subject to any disclaimer, the term of this patent is extended or adjusted under 35 U.S.C. 154(b) by 251 days.

(21) Appl. No.: 11/051,485

(22) Filed: Feb. 7, 2005

Related U.S. Application Data

(60) Provisional application No. 60/541,939, filed on Feb. 6, 2004.

(51) Int. Cl.
*G06F 17/00* (2006.01)
(52) U.S. Cl. ............... 707/102; 707/101; 707/104.1
(58) Field of Classification Search ......... 707/101–102, 707/104.1
See application file for complete search history.

(56) References Cited

U.S. PATENT DOCUMENTS 7,139,973 B1 * 11/2006 Kirkwood et al. ........... 715/513

* cited by examiner

*Primary Examiner*—Sana Al-Hashemi
(74) *Attorney, Agent, or Firm*—McCormick, Paulding & Huber LLP

(57) ABSTRACT

An application development environment is provided. Database contents or structure can be changed and the changes are seamlessly propagated to the applications or views that are impacted by the change. Similarly, from the application page, new database content can be added to the database. The taxonomy of the database is relational through the use context and data relationships are contextually presented by their relative relationships within a taxonomy structure. Controls are used to define the behavior of the application. The activity of each control is defined via declarative events. The application framework is generated from the taxonomy, which flexibly couples the application design to the required data.

18 Claims, 6 Drawing Sheets

US 7,421,450 B1

DATABASE EXTENSIBLE APPLICATION DEVELOPMENT ENVIRONMENT

RELATED APPLICATION

This application claims the benefit under 35 U.S.C. § 119(e) of U.S. Provisional Patent Application No. 60/541,939 filed on Feb. 6, 2004, entitled "Database extensible application development environment," which is incorporated by reference herein in its entirety.

TECHNICAL FIELD

This invention relates generally to rapid application development, and more particularly, to database extensible application development.

BACKGROUND

Computer software applications are conventionally developed or structured such that the database component of an application is typically independently constructed and structured either in advance of or in concert with the programming of an application interface and application processing layer. To the extent either database changes are required or made, or changes are made to an application or the user interface (which impacts the other component), a separate coding change is required to conform the components of the overall application. Ties between the application layer and the database are performed by programming database calls from the application to the database. These coding of these calls on a field-by-field basis is time consuming and is typically manually performed in traditional development environments. This process requires a programmer to first identify the information that is called with respect to one or more calls or functions on an application page, then examine the database table contents and other information structures and identify the appropriate database fields, then write the appropriate database call to facilitate a retrieval from or updating of information to the database environment and the application page.

Rapid development utilities have been developed to assist developers in both instances. In the case of database development tools, there are conventional tools that provide, among others things visual development relationship views, functional components libraries, code libraries, project management file structures and other reusable object libraries. Similarly, on the application side, a wide variety of tools and toolsets exist, such as Visual Studio and Visual InterDev (which are commercially available from Microsoft Corporation of Redmond, Wash.), that provide similar tools along with graphical editing and style sheet tools. What is needed is a tool or other implementation of program code that provide a contextual database infused real time, visual, integrated database and application development environment.

SUMMARY OF THE INVENTION

In one aspect, a method for creating an application component is provided. The method includes defining a taxonomy including a plurality of categories, storing the taxonomy in a database, and receiving, from a user, a category selection corresponding to at least one of the plurality of categories of the taxonomy. The method also includes applying data and controls to a view based on the selected category and generating the application component.

In another aspect, a system for creating an application component is provided. The system includes a taxonomy module, a database module, and an application module. The taxonomy module is configured to define a taxonomy including a plurality of categories. The database module is configured to store the taxonomy in a database. The application module is configured to receive, from a user, a category selection corresponding to at least one of the plurality of categories of the taxonomy, to apply data to a view based on the selected category, and to generate the application component responsive to the applying of data.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

The present disclosure relates to apparatus, methods, systems, and/or computer program products configured to provide a database extensible contextual object development environment (referred to herein as "DECODE"). An embodiment of the present disclosure is based upon the need for a rapid application development environment for web-based applications that require both rapid initial development and ongoing database and application changes. In order to effect quick application changes that involve database changes without requiring an experienced database coder, a novel approach to database modeling is necessary to allow efficient access to relational data within the context of the purpose of the application itself. DECODE solves this conventional problem of disassociated contextually between application interfaces and relational database structures.

Embodiments of DECODE are visually-based integrated applications and database infused development systems and methods that enable the development and maintenance of a use context infused database through a visual editing utility that may be placed into an application page within object control formats selected by the user and that immediately become active elements which are embedded, callable and updatable from the application, together with an integrated visual web application development editor that allows additional application controls and functions to be immediately embedded into the application. In one embodiment, the environment is real time, thus, as the DECODE database contents or structure is revised or updated, they are immediately reflected in the application page. Similarly, from the application page, new database content can be instantly added to the database. The topology or taxonomy of the database can be relational through the use context, as opposed to traditional table schemas and formal relationships built at the database structure level, and data relationships are contextually presented by their relative relationships within a visual hierarchical, logically relational taxonomy structure, and their representation within the application page use context.

A. Overall System

Figure 1:
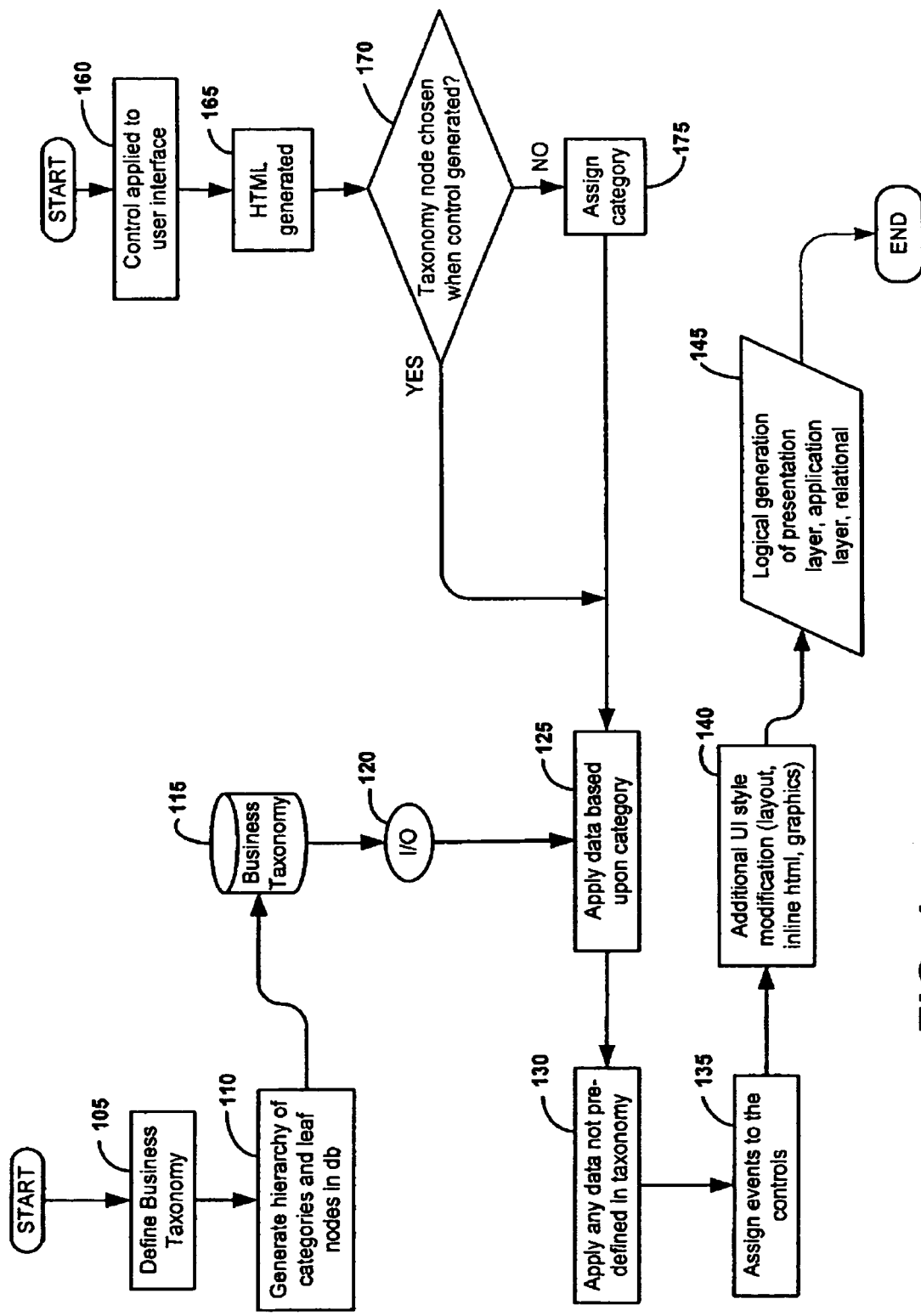
FIG. 1 is a flowchart illustrating a process of building an application according to an embodiment of the present invention.
Figure 4:
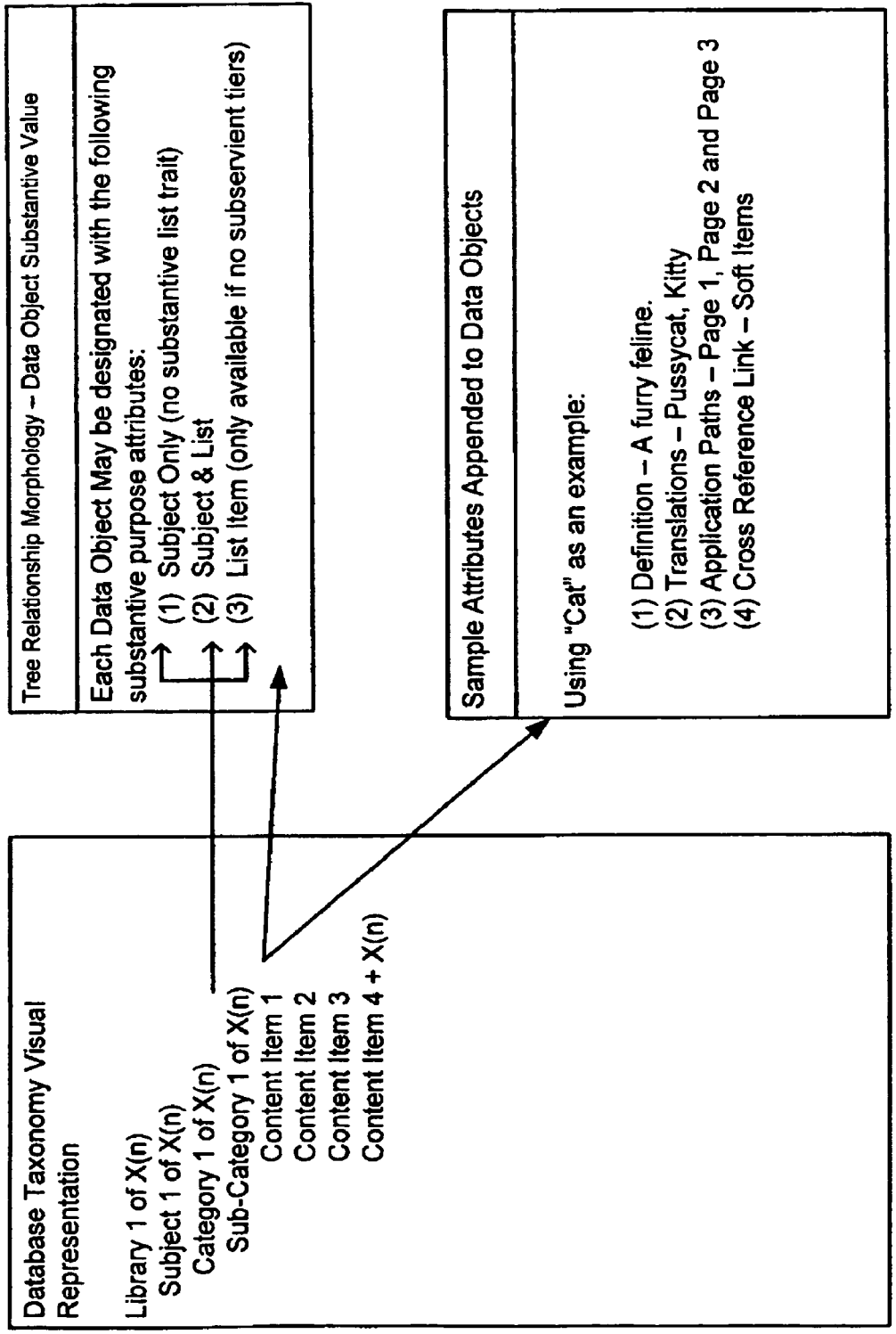
FIG. 4 is a diagram illustrating a taxonomy structure according to an embodiment of the present invention.

FIG. 1 is a flowchart illustrating a process of building an application according to an embodiment of the present invention. As one skilled in the art will appreciate, the steps or subparts of the flows illustrated in FIG. 1 need not be performed in a particular sequence. The illustrated process begins with defining 105 a business taxonomy. The taxonomy represents an expression of the database structure and provides the foundation for application or view development. The taxonomy also provides flexibility for changes to be made to the application. In certain embodiments, when a user or developer changes the taxonomy, the changes are automatically updated in the affected applications. A visual expression of an example taxonomy is shown in FIG. 4.

DECODE facilitates the development of a fully interactive database infused application through an integrated database and application environment that is infused by a contextual database development utility and model structure. The database utility utilizes logical use-context infused constructs that mirror the implicit purpose of the application to form logical tree structures in the data model and contextual references to the application page views to create rational and accessible data object models. Both the application page or form and the database taxonomy model are accessible and viewable within the same use environment. Data sets from the data libraries are accessible to and may be embedded into an application by a user command (which may be drag and drop, or mouse control initiated, for example), and represented in one or more control format types (such as a radio button, select boxes, pull down boxes or other control formats), as selected by the user. These controls and associated data are assigned unique identifications in reference to the page (or sub view context) to which they are associated by virtue of their position within the application page and relative reference to other objects on the application page or groups of pages. In an embodiment, DECODE also provides for a suite of application development tools and utilities that enable additional controls, objects, graphical functions, and objects to be placed within the application page.

Figure 3:
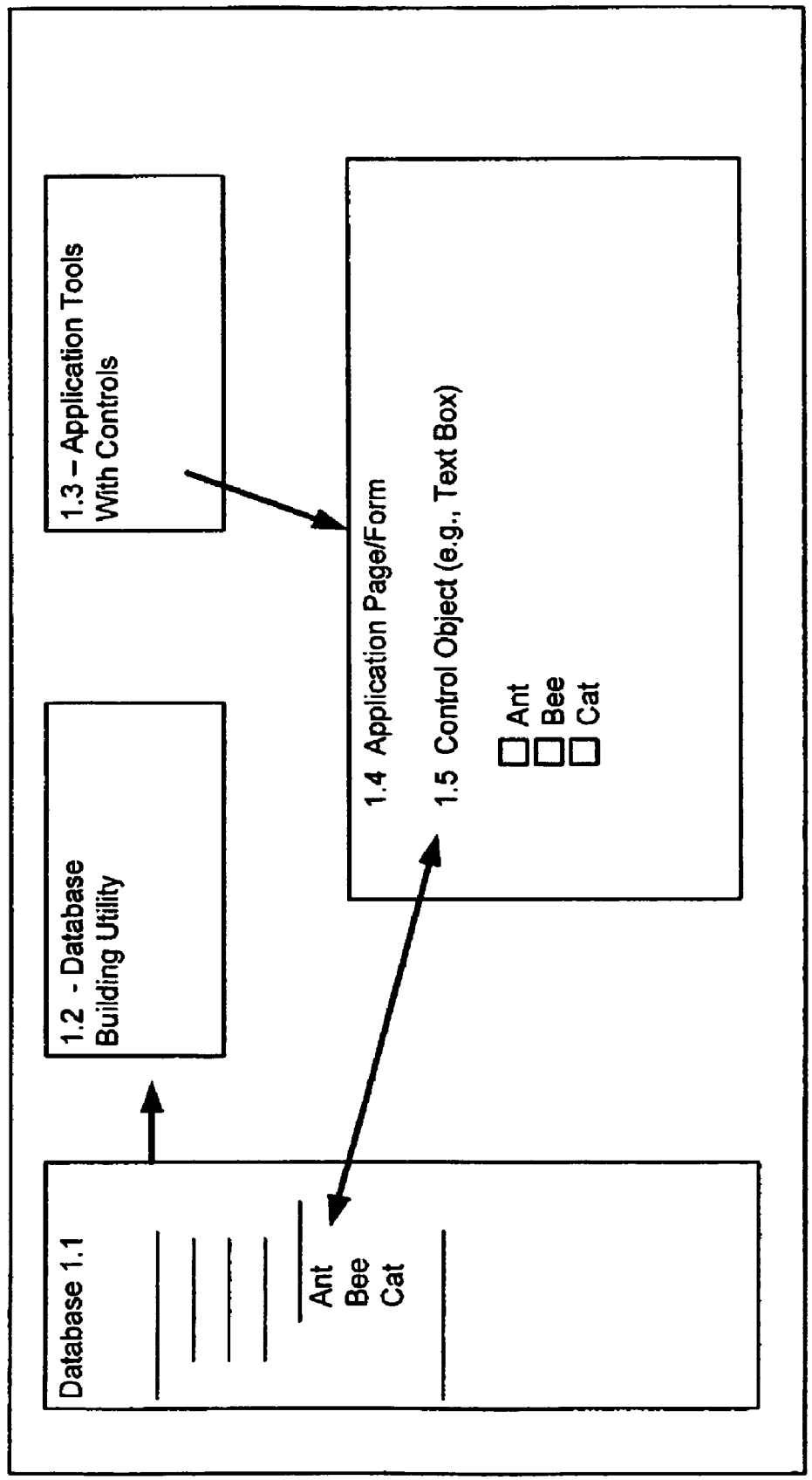
FIG. 3 is a diagram illustrating view creation according to an embodiment of the present invention.

A hierarchy of categories and leaf nodes are generated 110 and stored in database 115. Input/output events 120 provide a mechanism for accessing and manipulating the database 120. When creating or changing a view, a control is applied 160 to the user interface and hypertext markup language (HTML) is generated 165. If a taxonomy node is chosen 170 when the control is generated, then data is automatically applied 125 based upon the selected category. FIG. 3, for example, illustrates a control object including ant, bee and cat as defined in the taxonomy.

If a taxonomy node is not chosen, an opportunity is provided to assign 175 a category, and the method continues to step 125. Data is that is not pre-defined in the taxonomy is applied 130 to the view. Additionally, data that is defined in the taxonomy can be excluded and/or correlated from different categories to render a multi-dimensional dataset.

Events are assigned 135 to the controls. In certain embodiments, one or more controls are used to express the logic of the application. That is, the controls may jump to another view, perform a database query, format and display query results, generate a report, etc. Also, properties and user interface controls, along with their attributes, can be assigned to the view. Additional user interface style modification 140 is performed (e.g., layout, inline HTML, and graphics). The method generates 145 an application (including presentation layer and application (logic) layer). One skilled in the art will appreciate that the application may be a shell application (that includes partial functionality) or be a component that can be integrated with other application components.

In one embodiment, infusion is based on a meta-structure where the traits and attributes of an application and database are coherently meshed into an overall environment. In the case of the database environment, a metabase structure can be created wherein the database's morphological construct is defined, in part, by the application's morphology. Within the database environment data objects are created within a cascading tree structure, but are independent objects which may be moved or relocated within the taxonomy structure of the database, thus creating new relationships between data objects from a taxonomic perspective, while retaining relational context to the application without restructuring the underlying relational data table structures associated with conventional database morphologies. In other words data objects can be regrouped or re-associated within a taxonomy structure without adversely effecting the application and its pathways to those data objects. DECODE in addition to enabling this meta-structure, may provide visual representation tools and utilities that expose these meshed relationships, and provide development environment tools that permit database and application development functions to be performed within this meta-structure context.

The environment may be integrated such that as the database is updated or changes, the changes are automatically reflected within the application page. Data objects selected from the database that are placed within an application page may be molded and transfused with other data objects to create a unique contextual data object. In this manner multi-dimensional data object layers may be constructed from a hierarchical structure using the application view context as the formal relationship mechanism that results in the extra dimension. This topology differs from the traditional mechanism employed through related table structure formats at the database level.

In an embodiment, the database environment is further enabled by subject or other identifying labels or headers that describe the content of the database objects that follow. There may be an unlimited number of sub-levels or tiers within a tree branch with respect to a data object thus forming an unlimited hierarchical tree structure that is visually accessible and readable. The database model is further enhanced with additional data attribute dimensions that attached to data objects. These include definition, translation, application location(s) and other information reference attributes which may include third party or internal reference links. These attributes are attached to each data object and allow a view of the database taxonomy to search and find equivalents, approximates and use contexts that, together with the hierarchical tree structure and naming conventions, enable a user to navigate and find relevant data sets and lists.

Two more control types, which were assigned to selected data objects, may be grouped together within the application layer and presented in user defined formats, such as tables, columns and rows by assigning a unique grouping reference to an object group.

User Input data may also be collected, stored, and recalled within the integrated development via the contextual means of the application view. From the application editor, input controls, both user input based and those with predefined values based on associated data objects from the database, can be given unique identification values in reference to the application view, and inputs are stored within the database upon a determinative event, such as the user infused or other submit function initiated event.

Reporting, queries, and data display events within the application may be generated via an application page, or other reporting tool that displays within an application page, whereby data display objects, such as tables or other format objects, are used to direct data output from queries, and to structure queries by referencing the desired data object within the application page context. For example, this may be implemented by visually accessible data identification tags that are assigned to each data field within the application page. The data display objects have embedded query command structures that may be selected by the user and directed to the appropriate data via the data addressing tags embedded within the application view. In doing so, a data accessibility model is created that permits use context derived data object location and identification location, query and writing functions.

Figure 5:
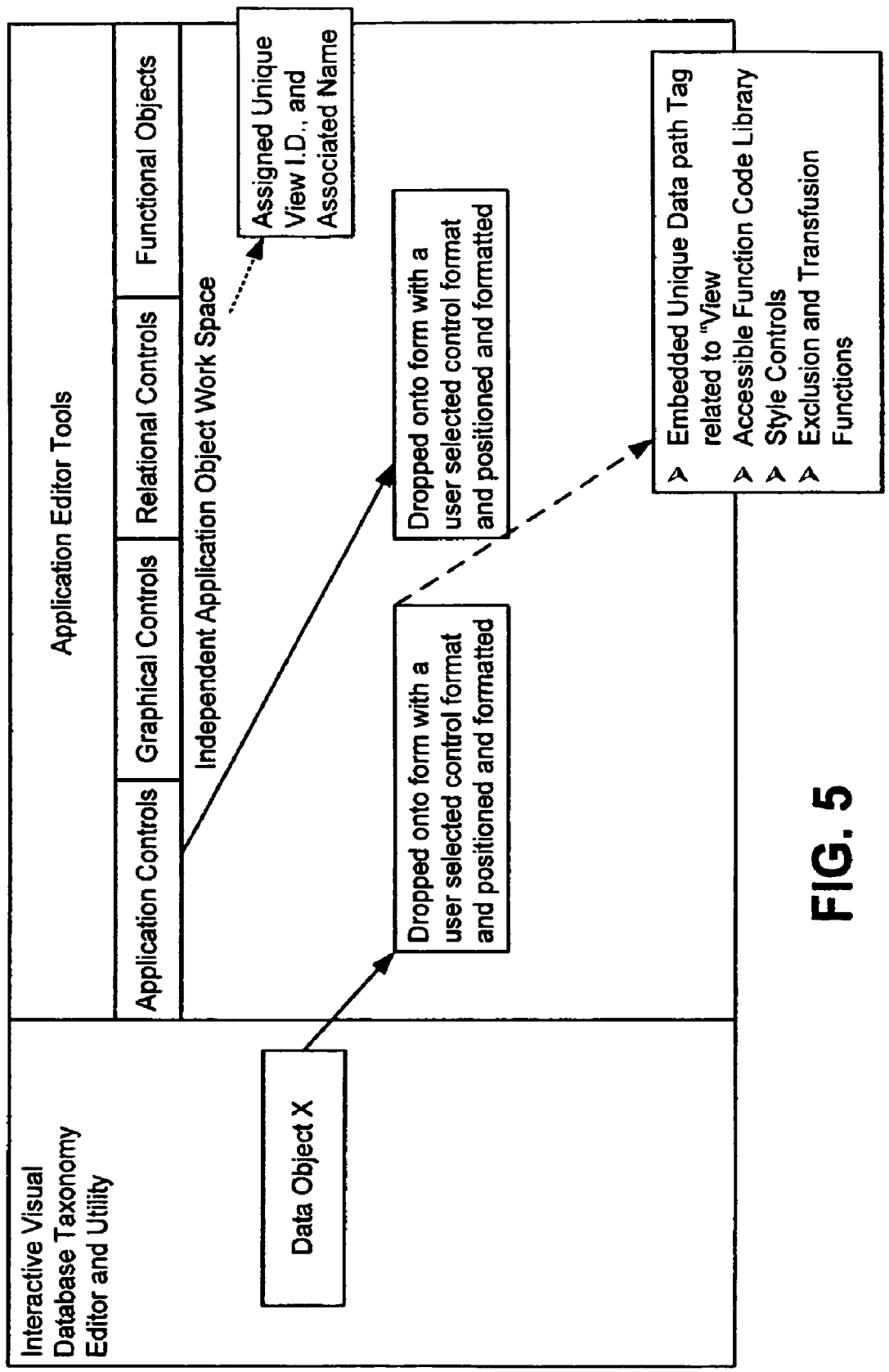
FIG. 5 is a diagram illustrating an application editor environment according to an embodiment of the present invention.

Application editor functions may include standard functional attributes, including code snippet modules, common control tools, graphical editor functions, project management file structures, visual object positioning tools such as drag and drop, scaling and style functions and attributes. An embodiment of the present disclosure may also include controls and attributes relating to functions relating to the integrated database, including intra-data object exclusion commands and inter-data object inclusion commands that create infused or meshed database objects that are defined referentially by application page or view. FIG. 5 illustrates an exemplary application editing environment including taxonomy elements, control elements, and an application object workspace.

Application functions are maintained within the application editor and are accessible through a code library. The code library contains common code for common function types that must execute within the application page context. Each code function is accessible by the user by reference to a common function name and may be associated with existing or new controls within the application page and data represented on, or contained elsewhere within the environment via structured database calls constructed by reference to discrete data objects found embedded within the application view context.

DECODE can be constructed and operate in any event based programming language and any database environment, including, for example, Application Server Pages (ASP), JavaScript, Visual Basic, VB Script, Java, Visual C, Visual C++, C#, and, in the case of database environments, Microsoft SQL, MySQL, Oracle, IBM DB2, FoxPro, and Microsoft Access.

B. Example Distinctions with Conventional Development Environments

DECODE is substantively different from Visual Basic Studio and other functionally equivalent development environment tools and utilities for software application development. Whereas certain development environment tools, such as Microsoft Visual Basic Studio, enable programmers to access database fields and link them to controls within their application forms or pages, the integration between the two environments is achieved through database reference paths that require a user to either know the existing path to the desired database field within the existing database model, or to directly access and search the database table structures through a separate database utility that maps or displays the overall structure.

In an embodiment of DECODE, a visual database taxonomy structure can be modeled in relation to the application use context. For example, in the case of a business application, the database taxonomy structure may be built in a logical tree structure with applicable business categories. Further, the contextual reference with respect to the control on the form or application page may be established in relation to form or page itself. Moreover, where as relational connections and dependencies between data elements and controls and functions are accomplished traditionally in the logical layer through database functions that in each instance must be written, an embodiment of DECODE automatically permits such relationships by context infused relational statements that can be ascertained by the application and embedded database paths that reside as unique addresses within the application, because of the form or page context.

C. Web-Based Features

Web-based Database Infused Editor for Web Browser based Applications. In addition to the features or functionalities described herein, an embodiment of DECODE permits the creation of database infused, web applications from an integrated application and database development environment. Whereas conventional editors create HTML (such as Front Page, Adobe PageMill, Macromedia's Director, and certain application development editors for ASP, such Visual InterDev), these editors do not include features for database infused application or page editors for web browser based applications, nor any HTML based editors for building web browser based applications.

Independent Application Objects (IAOs). In an embodiment, DECODE employs "views", which may be independent web page views within which independently functioning data infused applications, being comprised of one or more controls, graphical elements or other objects, can be executed and accessed through a browser session (Independent Application Objects" or "IAOs"). One or more IAOs can be embedded, on a mix and match, and reusable instance basis, into one or more other application pages, and made to coexist cohesively in each application page state, which is itself an IAO. Thus, DECODE can enable fully functional application objects which may be combined and arranged, which, in turn, creates other independent applications objects. This represent a substantive difference from typical form to application relationship constructs which require that forms or groups of forms be pre-defined in relation to an application through Dynamic Data Exchange (DDE) or Object Linking Embedding (OLE) conventions that provide static one to many relationships between an application page and one or more forms. In each case a separate Active X control is written for each instance of a form in relation to its application page use. In an embodiment of the present disclosure, an IAO may have a many to many relationship in relation to each application page, without DDE or OLE conventions.

Transforming Static HTML based Pages into Dynamic 2-Way Data Input and Output Application Forms. In an embodiment, DECODE enables static HTML rendered pages to be converted into two-way active web based forms which can allow pre-formed queried data (i.e, report formats) and dynamically queried data to be displayed in an HTML form, and for data changes or new data input to be added into the HTML based form through active controls that are meshed into the previously static HTML page. This technique, enabled through an embodiment of DECODE, permits any HTML rendered page output, including any text page created in, for example, Microsoft Word and rendered in HTML or Crystal Decisions based report that is rendered or exported into a predetermined data format (e.g., an HTML format), to be meshed with an active database application layer into a fully interactive two-way database driven application page or IAO. As a consequence, forms populated or partially populated from a database through a reporting tool or other text or graphical output utility that can rendered or permit the conversion to HTML format forms, may be represented and view within a browser or other viewer, and the data fields represented thereon may be activated through active data field input controls that permit changes or new information to be entered, submitted and the associated database information immediately updated. This technique solves a persistent problem that exists in user environments whereby reports or other text based forms are produced for printing through one medium, namely a reporting or other text publishing tool that permits easy formatting for printer output, but requires the Web-based (or HTML based) compliment of the same form to be independently produced with additional programming associated with database queries to handle pre-populated or queried out puts onto the Web-based version. Due to the fact the forms exist in separate environments, to the extent that any change is made in the medium of one form, the other must be independently re-conformed to the changes made.

D. Managing Data

In an embodiment, a DECODE-based application uses a small interpreter (whose code resides primarily in the file Decode.inc) to render metadata describing the location and appearance of dynamic hypertext markup language (DHTML) elements. Such elements can be referred to as "details," and a collection of related details can be referred to as a "view." One skilled in the art will note that, in code and data, details may also be referred to as "controls." Most typically, a view is used as a single screen or page in a browser-based application, but it may also be embedded in an IFRAME as part of a more complex design.

Many HTML elements are bound to data for the purposes of presenting choices to the user, and for storing the user's selections. One example of this is an HTML SELECT box. In order to realize the choices in such an element, DECODE defines "categories" and "choices." Categories are comprised of several related choices, and a detail can be assigned a category in order to present information to, and retrieve information from a user. Examples are provided below in the section concerning data realization.

When the user interacts with an element, and the DECODE-based page is refreshed (or the function fnSave is invoked) selections and input are stored as "values." Values are tagged with the name of the View, the name of the control, a Transaction Type associated with the nature of the data, and a Transaction ID unique of among data of this transaction type. Therefore a Control Name a Transaction Type and a Transaction ID together should uniquely identify a value. Concepts relating to values are used in retrieving and applying DECODE data in other technologies as described in further detail below.

Views and Categories, along with their child node Details and Choices, are created and managed in the DECODE editor, an Active Server Page application which creates the metadata to realize DECODE-based applications. FIG. 5 illustrates one example of the application editing environment.

E. Data Realization

Figure 2:
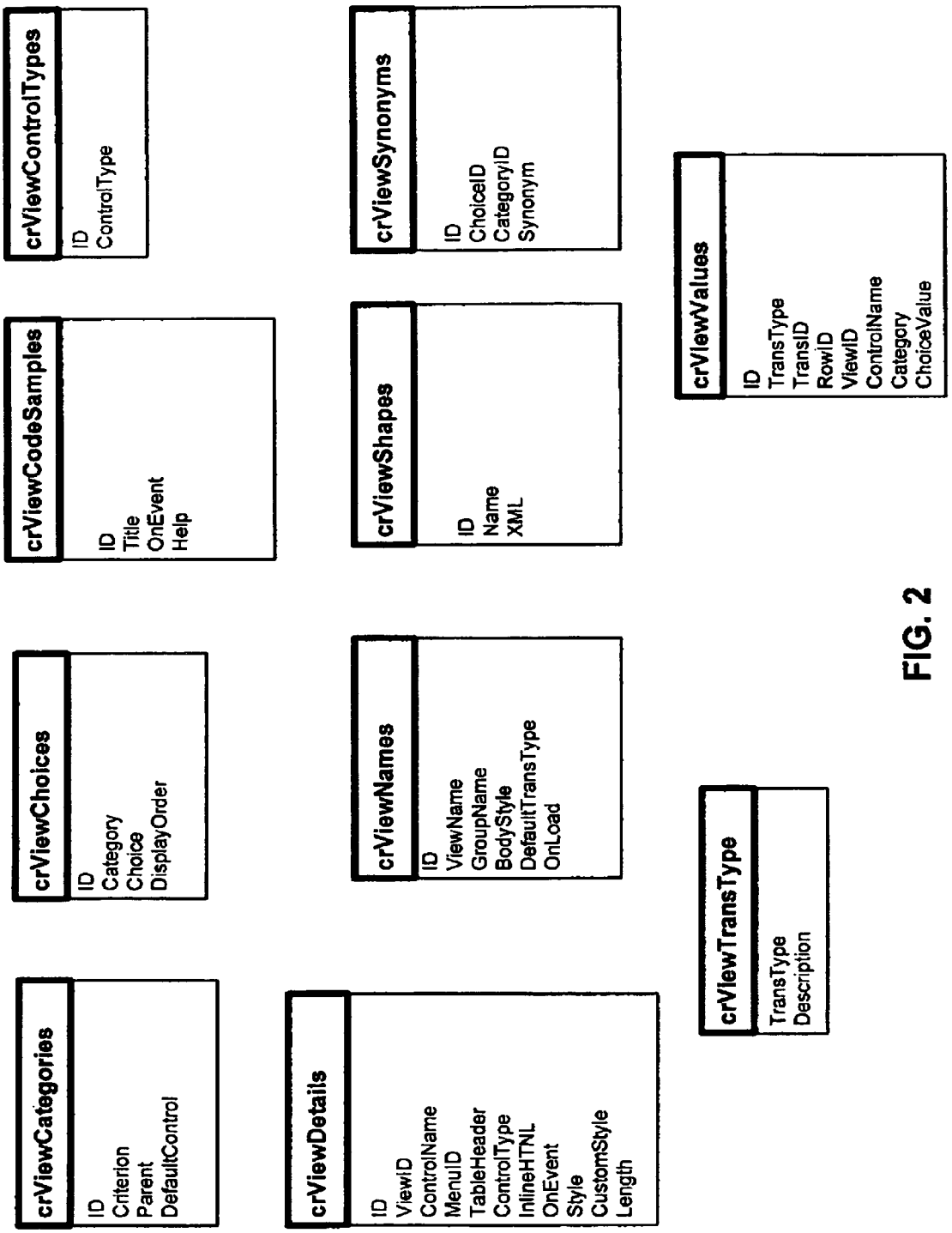
FIG. 2 illustrates database tables according to an embodiment of the present invention.

As one skilled in the art will appreciate, below is a description of relevant database tables as well as the purpose of the fields within the tables. FIG. 2 illustrates one example of the database tables.

1. crViewNames

This table contains a list of View names, whose ID's are used to sort DTHML details, and whose names are used primarily for identification by developers. Fields and their purposes are as follows:

ID—unique identifier, used to group the details which comprise the view, via foreign key crViewDetails.ViewID.

ViewName—the human-readable name of the View, passed to the DECODE viewer (described below) to invoke a specified view.

GroupName—A human-readable character string used to group related views to one another. This appears only in the DECODE Editor.

BodyStyle—HTML style code pertaining to the BODY element of the view. For instance, background-color.

DefaultTransType—The Transaction Type to be used if this View is invoked and no Transaction Type is passed as an argument.

OnLoad—javascript code to be run on the View's BODY ONLOAD event. This will most often be a call to an included function, and the file DecodeAppFn.inc is made available for this specific purpose.

2. crViewDetails

Each row of this table describes a single DTHML detail within a view. Fields and their purposes are as follows:

ID—unique identifier.

ViewID—The ID of the view in which this detail will appear.

ControlName—a developer-friendly name for the detail, used for programming references.

MenuID—The ID of the Category associated with this control, if any. This field may be considered a Category identifier.

Description—Descriptive text visible to the user at runtime. The exact behavior of this value varies according to detail type, but the clearest example is the text displayed in a label element.

TableHeader—By default, this will default to the same value as Description. However, it can be used to indicate different text to be used in a column header when this detail is used in a Table View.

ControlType—An integer representing a standard HTML control type, such as checkbox, radio button, select box, and so on. Non-standard control-types include constructs such as tables, and view-in-view controls.

InlineHTML—This is text that will be rendered inline within a detail's HTML text. The developer can modify this value to change the HTML class of an element, or modify attributes not supported in the style tag, such as MAXLENGTH.

OnEvent—The javascript code to be executed when this control is activated. The method of activation varies between control types. For instance, a button is activated on click, and a select box is activated on change. In most ambiguous cases, on click has been implemented. This text may include code inline, or it may be a call to an included function.

Style—Text rendered within a style modifier for this details HTML. This field's text is comprised of modifiers generated automatically by the DECODE Editor, including those for color, alignment, borders etc.

CustomStyle—Text rendered within a style modifier for this details HTML. This field's text can be edited manually by the developer, in order to realize behaviors not otherwise supported by the DECODE Editor.

Length—

X—The horizontal position of the detail within the view.

Y—The vertical position of the detail within the view.

Width—The width of the detail on screen.

Height—The height of the detail on screen.

Append—Choices to append to this specific control which are not included in its associated category by default.

Exclude—Choices in this control's category which should be omitted from this specific instance.

3. crViewCategories

This table contains rows representing categories, as they would be presented in controls with multiple selections. Fields and their purposes are as follows:

ID—Unique identifier.

Criterion—The descriptive text defining this category. This field may be considered a Category identifier.

Parent—The parent category to which this category belongs. This has no bearing on the application-level output of DECODE. Its purpose is to organize category and choice data in the "taxonomy" pane of the DECODE Editor.

DefaultControl—This value indicates the control type by which this category is represented by default, if it is placed directly in a view, rather than being assigned to an existing control.

4. crViewChoices

Each row of this table represents a choice or selection as it would be displayed in a multi-selection control, such as a select box or radio button. Fields and their purposes are as follows:

ID—Unique identifier.

Category—Foreign key grouping each choice with its corresponding category.

Choice—Text string describing the choice.

DisplayOrder—Integer values describing the order in which these choices will be displayed within their corresponding control. If NULL, the choices will be displayed alphabetically.

5. crViewValues

ID—Unique identifier.

TransType—The transaction type indicates the type of data that was specified when the viewer was invoked.

TransID—The transaction ID is specified when the viewer is invoked and must uniquely identify this datum within the transaction type in question.

RowID—A row identifier is used to distinguish between data on separate rows when a view is rendered as a table view.

ViewID—The identifier of the view that was used to save this datum.

ControlName—The name of the control associated with this datum.

Category—This value, inherited from the crViewDetails row corresponding with a detail, is associated with the category that can be used to resolve Choice Value.

Choice Value—The value selected or entered by the user. This may be a foreign key associated with an ID in the crViewChoices table—in which case Category will be non-null—or a string literal representing input data.

F. Concerning Values Data

Before the transactional data stored in crViewValues is examined, the transaction type and transaction ID fields TransType and TransID, respectively are described in more detail.

Each row of data in crViewValues corresponds with the value of a single detail within a view. As one skilled in the art will recognize, a view will be reused for many transactions, and therefore a transaction ID must be provided by the application which invokes the viewer. This transaction ID, an integer, must be unique within a context meaningful to the application, and because it will not likely be unique across all contexts, we assign an additional qualifier, called a Transaction Type, to each type of data stored by the application. For example, when the view named "Excursion Basic Info" is invoked, it is provided with a TransType of 6, and a TransID equal to the ID of the excursion being created or edited. Any rows of data subsequently saved will be tagged with these values, and can therefore be uniquely retrieved.

At first glance it would seem that the ViewID and TransType are redundant, and depending on usage this may or may not be true. The TransType is decoupled from the view so that single views could be used to store more than one type of information, or different views could be used to filter or "skin" the same data. However, in execution views may be cloned to implement similar transaction types (e.g., sales commissions). Therefore, one skilled in the art will appreciate, certain embodiments of the present invention may be modified to eliminate the TransType column altogether, replacing code which depends on it with code that instead uses the ViewID. Note that this modification may require scripting of data conversion for any existing customer data. The RowID field adds an additional dimension, and is used for distinguishing between rows of data in a table, when DECODE fields are rendered in table format.

Because this schema is normalized, and because crViewValues carries several identifying fields as overhead per value, scalability is considered. In certain embodiments, considerations are made as to archiving values within this table when they are no longer of immediate concern from a business perspective. In certain implementations, the system may search for child nodes within the crViewValues table belonging to rows being archived from conventional, relational tables elsewhere in a particular application. Alternately, a timestamp column may be added to the crValuesTable and rows could be archived based on age, but as one skilled in the art will appreciate, this is dependent on a specific application's business rules.

G. Querying Data

Having described the structure of the tables, several examples are provided for describing the operation and function with respect to user data in crViewValues.

First consider a sample of crViewValues data in its raw form, for instance:

SELECT * FROM crViewValues WHERE TransType=6 AND TransID=3

In this instance, we specify a TransType of 6, which corresponds with "Excursion Summary Information." See Table 1 below, which provides example transaction types. Additionally, we specify a Transaction ID of 3. This corresponds with a specific Excursion ID. The results are as follows:

| ID | Trans Type | Trans ID | Row ID | View ID | ControlName | Category | ChoiceValue |
|----|------------|----------|--------|---------|-------------|----------|-------------|
| 1 | 6 | 3 | NULL | 768 | chkTimeSlot | 570 | 0, 1669 |
| 2 | 6 | 3 | NULL | 768 | Ctl7 | 569 | 1675 |
| 3 | 6 | 3 | NULL | 768 | selTheme | 520 | 1461 |
| 4 | 6 | 3 | NULL | 768 | txtDuration | 0 | 2 |
| 5 | 6 | 3 | NULL | 768 | radTypes | 567 | 1662 |
| 6 | 6 | 3 | NULL | 768 | chkItems | 568 | 0, 1664, 1666 |
| 7 | 6 | 3 | NULL | 768 | Ctl23 | 560 | 1619 |
| 8 | 6 | 3 | NULL | 768 | txtName | 0 | Moscow Escursion |
| 9 | 6 | 3 | NULL | 768 | Ctl28 | 0 | From Moscow to Uglich |

We can narrow our query further in order to acquire a specific value according with a control name, as follows:

SELECT ChoiceValue FROM crViewValues WHERE TransType=6 AND TransID=3 AND ControlName='txtName'

ChoiceValue Moscow Escursion

Now, we can use some SQL grouping techniques to rotate this highly normalized data, and display it in a more convenient fashion, for instance:

SELECT TransID AS ExcursionID,
MAX(CASE ControlName WHEN 'chkTimeSlot' THEN ChoiceValue ELSE '' END) AS CruisePrice,
MAX(CASE ControlName WHEN 'Ctl7' THEN ChoiceValue ELSE '' END) AS Status,
MAX(CASE ControlName WHEN 'selTheme' THEN ChoiceValue ELSE '' END) AS Theme,
MAX(CASE ControlName WHEN 'txtDuration' THEN ChoiceValue ELSE '' END) AS Duration,
MAX(CASE ControlName WHEN 'radTypes' THEN ChoiceValue ELSE '' END) AS Type,
MAX(CASE ControlName WHEN 'chkItems' THEN ChoiceValue ELSE '' END) AS Items,
MAX(CASE ControlName WHEN 'Ctl23' THEN ChoiceValue ELSE '' END) AS Activity,
MAX(CASE ControlName WHEN 'txtName' THEN ChoiceValue ELSE '' END) AS ExcursionName,
MAX(CASE ControlName WHEN 'Ctl28' THEN ChoiceValue ELSE '' END) AS Description
FROM crViewValues
WHERE TransType=6
GROUP BY TransID ORDER BY TransID Note that the "AS" clauses are used to replace non-intuitive control names with recognizable column names. This results in the following data:

| | | | | | | | | |
|---|---|---|---|---|---|---|---|---|
| 3 | 0, 1669 | | 1675 | 1461 | 2 | 1662 | 0, 1664, 1666 | 1619 Moscow Escursion From Moscow to Uglich. |
| 4 | 0 | | 1675 | 1464 | | 1663 | 0 | 1633 Moscow Excursion8 |
| 5 | 0 | | 1675 | 1474 | | | 0 | 1619 Uglich Tour |
| 6 | 0 | | 1675 | 1461 | | | 0 | 1619 Yaroslavl Sightseeing |
| 7 | 0 | | 1675 | 1461 | | | 0 | 1627 Kizhi Island Walking Tour |
| 8 | 0 | | 1675 | 1464 | | | 0 | 1626 St. Petersburg Cathredral |
| 9 | 0 | | 1675 | 1461 | | | 0 | 1631 Eifel Tower |
| 13 | 0 | | 1675 | 1609 | | | 0 | 1619 Kuranda Scenic Railway |
| 14 | 0, 1669 | | 1675 | 1470 | | 1662 | 0 | 1619 Flower Gardens |
| 30 | 0 | | 1675 | 1464 | | | 0 | 1633 test |

Now, we can join in the crViewChoices table to resolve some of the integer Ids in the above data. In certain embodiments, DECODE uses an outer join, because some value rows do not correspond with crViewChoices rows, and it must first cast the integer ID in crViewChoices to a VARCHAR for compatibility. Then it replaces the ChoiceValue references with references to the Choice field in crViewChoices, as follows:

```
SELECT TransID AS ExcursionID,
MAX(CASE ControlName WHEN 'chkTimeSlot' THEN
    ChoiceValue ELSE '' END) AS CruisePrice,
MAX(CASE ControlName WHEN 'Ctl7' THEN c.Choice
    ELSE '' END) AS Status,
MAX(CASE ControlName WHEN 'selTheme' THEN
    c.Choice ELSE '' END) AS Theme,
MAX(CASE ControlName WHEN 'txtDuration' THEN
    ChoiceValue ELSE '' END) AS Duration,
MAX(CASE ControlName WHEN 'radTypes' THEN
    c.Choice ELSE '' END) AS Type,
MAX(CASE ControlName WHEN 'chkItems' THEN
    ChoiceValue ELSE '' END) AS Items,
MAX(CASE ControlName WHEN 'Ctl23' THEN
    c.Choice ELSE '' END) AS Activity,
MAX(CASE ControlName WHEN 'txtName' THEN
    ChoiceValue ELSE '' END) AS ExcursionName,
MAX(CASE ControlName WHEN 'Ctl28' THEN
    ChoiceValue ELSE '' END) AS Description
FROM crViewValues
LEFT OUTER JOIN crViewChoices c on CAST(c.ID AS
    VARCHAR(99))=crViewValues.ChoiceValue
WHERE TransType=6
GROUP BY TransID ORDER BY TransID
```

Resulting in:

| | | | | | | | |
|---|---|---|---|---|---|---|---|
| 3 | 0, 1669 | Approved | Historical Sites | 2 | Guided/Escorted | 0, 1664, 1666 | |
| | Siteseeing | Moscow Escursion | | From Moscow to Uglich. | | | |
| 4 | 0 | Approved | Antiques & Crafts | | Independent | 0 | Harbor |
| Cruise | Moscow Excursion 8 | | | | | | |
| 5 | 0 | Approved | Religous Sites & Buildings | | | 0 | |
| | Siteseeing | Uglich Tour | | | | | |
| 6 | 0 | Approved | Historical Sites | | 0 | Siteseeing | |
| | Yaroslavl Sightseeing | | | | | | |
| 7 | 0 | Approved | Historical Sites | | 0 | Historic Site Visit | |
| | Kizhi Island Walking Tour | | | | | | |
| 8 | 0 | Approved | Antiques & Crafts | | | 0 | Museum Visit |
| | St. Petersburg Catherdral | | | | | | |
| 9 | 0 | Approved | Historical Sites | | 0 | National/Local Park Visit | |
| | Eifel Tower | | | | | | |
| 13 | 0 | Approved | Museums and Historical Sites | | | 0 | |
| | Siteseeing | Kuranda Scenic Railway | | | | | |
| 14 | 0, 1669 | Approved | Ecological Tour | | Guided/Escorted | 0 | Siteseeing |
| | Flower Gardens | | | | | | |
| 30 | 0 | Approved | Antiques & Crafts | | | 0 | Harbor Cruise |
| | test | | | | | | |

This data can be inserted into a traditional table, and used to convert a DECODE module to a traditional relational database/Active Server Page solution. In this way, DECODE can be used to prototype solutions, and the resulting data can be redeployed in a conventional technology if desired.

One field which is not easily resolved in SQL is the comma-delimited "Cruise Price" field (2nd column). Multi-value data of this sort results from the use of checkboxes, and typically require the use of code in order to split and resolve individual values. The developer may determine the best means of representing the one-to-many relationship implied, either with a delimited field or a pivot table, for example.

Table 1 illustrates exemplary transaction types, which of course may vary depending on the content of the application or environment.

TABLE 1

| Transaction type | Description |
|---|---|
| 1 | Cabin Room Areas |
| 2 | Deck Areas |
| 3 | Cabin Category Additional Requirements |
| 4 | |
| 5 | Entertainment |
| 6 | Excursion Basic Info |
| 7 | Biz View Commission Arrangements |
| 8 | Consort View Commission Arrangements |
| 9 | Booking Confirmation/Invoice |
| 10 | Supplier Information |
| 11 | Passenger Information Form |
| 12 | Credit Card Authorization |
| 13 | Additional Pax Info |
| 14 | Comprehensive Insurance Rates |
| 15 | Standard Insurance Rates |
| 16 | Basic Insurance Rates |
| 17 | Report information |
| 18 | |
| 19 | |
| 20 | Agency Commission Detail |
| 21 | Consortium Commission Detail |
| 22 | Agency Commissions |
| 23 | Consortium Commissions |
| 24 | Package Commission Caps |
| 25 | Default Commission Detail |
| 26 | Travel Safe Insurance |

TABLE 1-continued

| Transaction type | Description |
|---|---|
| 27 | Hotel Property Information |
| 28 | Regional Commission Caps |
| 29 | Operations Dates |
| 30 | Immigration Cards |

TABLE 1-continued

| Transaction type | Description |
|---|---|
| 31 | Other report information |
| 32 | Group Commissions |
| 999 | Transaction Types (this table) |

H. Database Maintenance

The following description provides more details about deploying and maintaining a DECODE-based application. As one skilled in the art will recognize, the metadata which comprises the DECODE views themselves—program behavior which would typically be defined by code—is primarily determined by the data in the tables as described herein.

In certain embodiments, initial deployment requires that the five tables described herein, namely crViewName, crViewDetails, crViewCategories, crViewChoices, and crViewValues, be imported to the client's database. Only the structure of crViewValues is required, and its rows may be deleted to eliminate any test data inserted during development. Thereafter, as understood be those skilled in the art, this table's rows cannot be compromised or user data may be lost.

Next the metadata in crViewNames and crViewDetails is considered, which together define the appearance and behavior of the views on-screen. To preserve the metadata during updates, it may be necessary to backup exiting tables (e.g., crViewNames and crViewDetails) then re-import the tables to update, deleting the backup tables only after the updates have been tested and approved.

As one skilled in the art will recognize, the OnEvent and OnLoad fields in crViewDetails and crViewNames, respectively, may include function calls which are included in a file located on the file system. Therefore, it is may be necessary to couple an update of these tables with an update of the include file, or any files which contain modified functions called by new DECODE elements.

Furthermore, the content of crViewCategories and crViewChoices is considered. Because these comprise the lookup values for much of the user data in a DECODE-based application, the ID's assigned when the application is deployed should be maintained for the lifespan of the user data. For instance, if a developer deletes a row from crViewChoices, any rows in crViewValues whose ChoiceValue corresponds with that row will be left with an unresolved value, and that DECODE element will behave as if no data has been saved.

A typical problem with maintaining the ID fields is that SQL identity columns without constraints may be inadvertently reset by a tool or procedure. This results in Choices which do not properly correspond with their categories, and user data (Values) which do not correspond with valid Choices. Similarly, if the ID's in crViewNames or crViewDetails are compromised, views will not be rendered properly in the application. One solution to this typical problem is to turn off the identity fields after copying these databases to production or client sites, but as one skilled in the art will recognize, this may preclude the proper operation of the DECODE editor if this is deployed for client use.

An example of transferring data from development to a client site is provided. If a new category named "Answers" is added, we would query:

SELECT ID, Criterion, Parent, DefaultControl FROM crViewCategory WHERE Criterion='Answers'

This will transfer a single row from the development site to the client site. (Omit the ID column if the identity field is active on the client site: SELECT Criterion, Parent, DefaultControl FROM crViewCategory WHERE Criterion='Answers'. The ID will be auto-generated.)

Then, query again, selecting the corresponding Choice values:

SELECT ch.ID, ch.Category, ch.Choice, ch.DisplayOrder FROM crViewChoices ch JOIN crViewCategories cat ON cat.ID=ch.Category WHERE cat.Criterion='Answers'

Or simply determine the ID of the Answers category in advance, and apply it as follows:

SELECT ch.ID, ch.Category, ch.Choice, ch.DisplayOrder FROM crViewChoices ch WHERE ch.Category=CategoryID Again, omit the ID field if the ID will be auto-generated by the customer database. So, in summary:

crViewValues—this table is copied from the development site to the client site at the time of initial application deployment. The rows should be deleted but the structure should be left intact. The ID column's identity status must be turned on for the application to run properly.

crViewNames, crViewDetails—these tables are kept identical in the client database to those in the development database. Initially, they should be deployed as is crViewValues, but their rows are left intact. When changes are made to these tables in development (typically through use of the DECODE editor), these tables should dropped (or renamed for back-up purposes) and reimported. One skilled in the art will note that this procedure may be modified to accommodate customer-specific changes to views.

One way of simplifying database maintenance is to create Client1ViewA and Client2ViewA in both databases, and then use logic at the application level to select the correct view. This technique allows the development tables to be distributed more easily.

crViewCategories, crViewChoices—Provided that a client's categories and choices remain substantially the same as those used in the development database, these can be deployed and maintained as crViewNames and crViewDetails are. Otherwise, the tables may be deployed once, modified per customer requests or new development (as described above) and not overwritten with development data again.

Note that in the example provided in Table 1 the final transaction type, 999, is used to store transaction types. Therefore, the following query can be used to obtain this information from crViewValues. As one skilled in the art will recognize, this information is kept up-to-date in order to prevent reuse of these transaction types. In certain embodiments, the DECODE editor provides a viewer for managing these values.

SELECT a.choicevalue, b.choicevalue, c.choicevalue
FROM crviewvalues a
JOIN crviewvalues b ON b.transtype=a.transtype
AND b.transid=a.transid AND b.rowid=a.rowid AND
    b.controlname='txtName'

JOIN crviewvalues c ON c.transtype=a.transtype AND c.transid=a.transid
AND c.rowid=a.rowid AND c.controlname='txtComment'
WHERE a.transtype=999 AND a.controlname='txtID'

I. Computing Device

Figure 6:
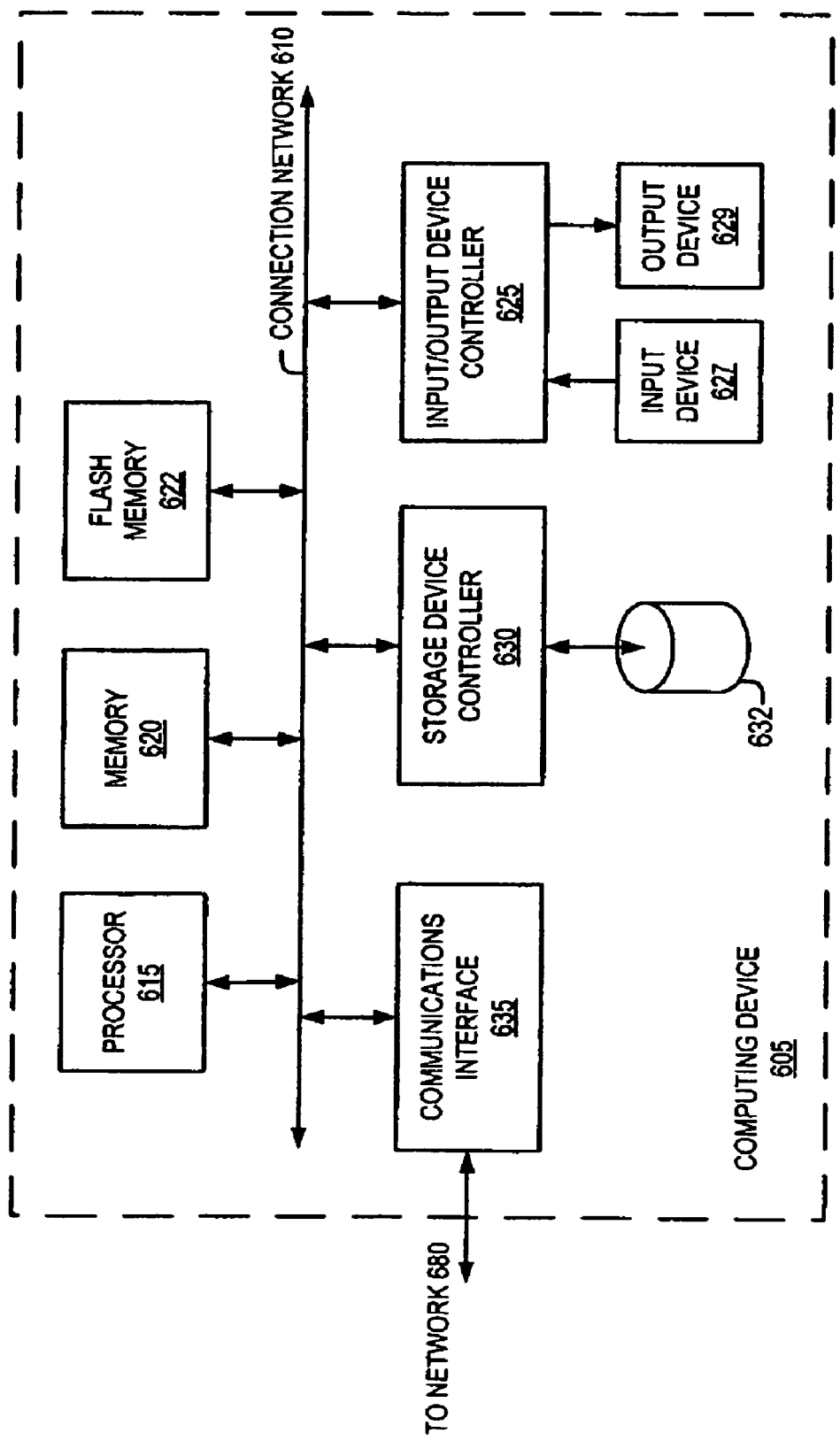
FIG. 6 is a block diagram illustrating a computing device for implementing certain embodiments of the present invention.

FIG. 6 is a block diagram illustrating a computing device for implementing certain embodiments of the present invention. That is, the illustrated computer architecture may function as a client, a server, or both in implementing the application development concepts described herein. In the illustrated embodiment, the computing device 605 includes a connection network 610, a processor 615, a memory 620, a flash memory 622, an input/output device controller 625, an input device 627, an output device 629, a storage device controller 630, and a communications interface 635. Also included is an internal storage device 632, such as a hard disk drive.

The connection network 610 operatively couples each of the processor 615, the memory 620, the flash memory 622, the input/output device controller 625, the storage device controller 630, and the communications interface 635. The connection network 610 can be an electrical bus, switch fabric, or other suitable interconnection system.

The processor 615 is a conventional microprocessor, such as a Pentium 4 processor (which is commercially available from Intel Corp. of Santa Clara, Calif.). The processor 615 executes instructions or program code modules from the memory 620 or the flash memory 622. The operation of the computing device 605 is programmable and configured by the program code modules. Such instructions may be read into memory 620 or the flash memory 622 from a computer readable medium, such as a device coupled to the storage device controller 630. In addition, instructions may be read into or loaded into the memory 620 or the flash memory 622 from a device coupled to the input/output device controller 625.

Execution of the sequences of instructions contained in the memory 620 or the flash memory 622 cause the processor 615 to perform the method or functions described herein. In certain embodiments, the memory 620 includes program code modules such as a taxonomy module, a database module, and an application module. In certain embodiments, hardwired circuitry may be used in place of or in combination with software instructions to implement aspects of the disclosure. Thus, embodiments of the disclosure are not limited to any specific combination of hardware circuitry and software. The memory 620 can be, for example, one or more conventional random access memory (RAM) devices. The flash memory 622 can be one or more conventional flash RAM, or electronically erasable programmable read only memory (EEPROM) devices. The memory 620 may also be used for storing temporary variables or other intermediate information during execution of instructions by processor 615.

The input/output device controller 625 provides an interface to the input device 627 and the output device 629. The output device 629 can be, for example, a conventional display screen. The display screen can include associated hardware, software, or other devices that are needed to generate a screen display. In another embodiment, the output device 629 is a conventional liquid crystal display (LCD). The illustrated embodiment also includes an input device 627 operatively coupled to the input/output device controller 625. The input device 627 can be, for example, an external or integrated keyboard or cursor control pad.

The storage device controller 630 can be used to interface the processor 615 to various memory or storage devices. In the illustrated embodiment, an internal storage device 632 is shown for storing program code that implements the features or functions described herein as well as other software applications, such as an operating system.

The communications interface 635 provides bidirectional data communication coupling for the computing device 605. The communications interface 635 can be functionally coupled to the network 680. In certain embodiments, the communications interface 635 provides one or more input/output ports for receiving electrical, radio frequency, or optical signals and converts signals received on the port(s) to a format suitable for transmission on the connection network 610. The communications interface 635 can include a radio frequency modem and other logic associated with sending and receiving wireless or wireline communications. For example, the communications interface 635 can provide an Ethernet interface, Bluetooth, and/or 802.11 wireless capability for the computing device 605.

In summary, some aspects of the present invention include (1) Declarative, aggregated event generation—The activity of each control is defined via declarative events, where an event is a logical grouping of physical events. For example, a "save and submit" event would be treated by decode as atomic; and (2) Business Taxonomy is the central entity from which the application framework can be generated dynamically. This supports the data centric nature of the present invention where the data is tied to the application design intrinsically rather than in conventional systems where a path to the data must be set explicitly.

Having described embodiments of database extensible application development environment (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for creating development tool for controlling a component of an application by referencing a relational database structure, the method comprising:

defining a taxonomy from a hierarchical review of use-context and leaf nodes of the data in the database structure, the taxonomy including a plurality of object control format categories;

storing the taxonomy in a database;

receiving, from a user, a category selection corresponding to at least one of the plurality of categories of the taxonomy;

defining category data with default values, in accordance with the category selection;

applying data, from the database, corresponding to the category selection and default category data values to a view based on the selected category and default category data values; and generating the development tool for controlling the component of the application, including a user interface and an associated functionality, corresponding to the applying of data;

wherein the development tool provides an association between the user interface and the database structure enabling real-time, automatic updating of the development tool in response to changes to the database structure.

2. A system for creating development tool for controlling a component of an application by referencing a relational database structure, the system comprising:

a taxonomy module configured to define a taxonomy from a hierarchical review of use-context and leaf nodes of the data in the database structure, the taxonomy including a plurality of object control format categories;

a database module configured to store the taxonomy in a database; and an application module configured to receive, from a user, a category selection corresponding to at least one of the plurality of categories of the taxonomy, to define category data with default values, in accordance with the category selection, to apply data, from the database, corresponding to the category selection and default category data values to a view based on the selected category, and to generate the development tool for controlling the component of the application, including a user interface and an associated functionality, corresponding to the applying of data;

wherein the development tool provides an association between the user interface and the database structure enabling real-time, automatic updating of the development tool in response to changes to the data stored in the database structure.

3. The method of claim 1 further comprising:
associating a unique identifier to the view.

4. The method of claim 1 further comprising:
performing at least one of adding additional categories to the taxonomy and rearranging one of the plurality of categories.

5. The method of claim 1 further comprising:
applying a control to the view, the control configured to define a behavior for the view.

6. The method of claim 1 further comprising:
incorporating the application component into a shell application.

7. The method of claim 1 further comprising:
linking the application component with another application component.

8. The method of claim 1 wherein the taxonomy comprising a logical tree structure having business categories.

9. The method of claim 1 wherein the view is displayed in a web browser.

10. The system of claim 2 wherein the application module is further configured to associate a unique identifier to the view.

11. The system of claim 2 wherein the application module is further configured to perform at least one of adding additional categories to the taxonomy and rearranging one of the plurality of categories.

12. The system of claim 2 wherein the application module is further configured to apply a control to the development tool, the control configured to define a behavior of the development tool.

13. The system of claim 2 wherein the application module is further configured to incorporate the application component into a shell application.

14. The system of claim 2 wherein the application module is further configured to link the application component with another application component.

15. The system of claim 2 wherein the taxonomy comprising a logical tree structure having business categories.

16. The system of claim 2 wherein the view is displayed in a web browser.

17. The method of claim 3 further comprising:
storing the unique identifier in the database.

18. The system of claim 10 wherein the application module is further configured to store the unique identifier in the database.

* * * * *

UNITED STATES PATENT AND TRADEMARK OFFICE
CERTIFICATE OF CORRECTION

| | | |
|---|---|---|
| PATENT NO. | : 7,421,450 B1 | Page 1 of 1 |
| APPLICATION NO. | : 11/051485 | |
| DATED | : September 2, 2008 | |
| INVENTOR(S) | : Joseph R. Mazzarella et al. | |

It is certified that error appears in the above-identified patent and that said Letters Patent is hereby corrected as shown below:

Column 18, Claim 1, line 50, after the word "creating" please insert -- a --.

Column 19, Claim 2, line 10, after the word "creating" please insert -- a --.

Signed and Sealed this

Thirty-first Day of March, 2009

JOHN DOLL
*Acting Director of the United States Patent and Trademark Office*